United States Patent
Gesnot et al.

(10) Patent No.: US 7,724,825 B2
(45) Date of Patent: May 25, 2010

(54) VIDEO DATA PROCESSING METHOD BY CALCULATING A DCT OF THE CONCATENATED DATA SET

(75) Inventors: Arnaud Gesnot, Montigny le Bretonneux (FR); Carolina Miro Sorolla, Villecresnes (FR); Jorge E. Caviedes, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 2283 days.

(21) Appl. No.: 09/970,009

(22) Filed: Oct. 3, 2001

(65) Prior Publication Data

US 2002/0126761 A1 Sep. 12, 2002

(30) Foreign Application Priority Data

Oct. 10, 2000 (FR) .................................. 00 12936

(51) Int. Cl.
*H04N 7/12* (2006.01)
(52) U.S. Cl. ................................... 375/240.2
(58) Field of Classification Search ............ 375/240.01, 375/240.12, 240.18, 240.2, 240.21, 240.24, 375/240.26; *H04N 7/12*
See application file for complete search history.

(56) References Cited

OTHER PUBLICATIONS

"A projection-based post-processing technique to reduce blocking artifacts using a prior information on DCT coefficients of adjacent blocks" by published by Hoon Paek and Sang-Uk Lee, in Proceedings of 3rd IEEE International Conference on Image Processing, vol. 2, Lausanne, Switzerland, Sep. 16-19, 1996, pp. 53-56.

*Primary Examiner*—Young Lee

(57) ABSTRACT

A method and an arrangement for processing data in a digital input image include a decoder configured to decode encoded data. A detector is configured to detect the decoded data and a correction device is configured to correct the detected data. A predicted maximum frequency is calculated based on first and second data sets transformed by first and second transform, respectively. A real maximum frequency is calculated based on data transformed by an overall transform of a data set corresponding to the concatenation of the first and second data sets. A grid is determined by comparing the real and predicted maximum frequencies for a portion of the digital input image.

3 Claims, 2 Drawing Sheets

VIDEO DATA PROCESSING METHOD BY CALCULATING A DCT OF THE CONCATENATED DATA SET

The present invention relates to a method of processing data comprised in a digital input image.

It may be employed in the detection of blocks in a digital image which has been previously encoded and which is subsequently decoded in accordance with a block-based encoding technique, for example the MPEG standard (Motion Picture Experts Group), and in the correction of the data comprised in the blocks in order to reduce visible artifacts caused by the block-based encoding technique.

The article entitled "A projection-based post-processing technique to reduce blocking artifacts using a priori information on DCT coefficients of adjacent blocks", published by Hoon Paek and Sang-Uk Lee, in "Proceedings of 3rd IEEE International Conference on Image Processing, vol 2, Lausanne, Switzerland, 16-19 Sep. 1996, pp. 53-56" described a method of processing data comprised in a digital image.

In contrast with most methods currently used said method is employed in the frequency domain, i.e. after a discrete transform has been applied to the digital input image, and not in the spatial domain. This discrete transform is, for example, a discrete cosine transform DCT. It is an object of the processing method to correct DCT coefficients which correspond to block artifacts. In order to find and suppress the frequencies associated with the block artifacts the prior art method consists of the following steps of:

calculating a first discrete cosine transform U of a segment u of N pixels where N=8 in the present example: U=DCT[u]={U(0), U(1), . . . , U(N−1)}, where $$U(k) = \alpha(k) \sum_{n=0}^{N-1} u(n)\cos\left(\frac{\pi(2n+1)k}{2N}\right)$$

in which k is the frequency of the transformed data U, k∈[0,N−1]

calculating a second discrete cosine transform V of a second segment v of N pixels, adjacent to the segment u: V=DCT(v)={V(0), V(1), . . . , V(N−1)}, i.e.

$$V(k) = \alpha(k) \sum_{n=0}^{N-1} v(n)\cos\left(\frac{\pi(2n+1)k}{2N}\right)$$

calculating an overall discrete cosine transform W for a segment w of 2N, i.e. 16 pixels corresponding to the concatenation of the segments u and v: W=DCT(w)={W(0), W(1), . . . , W(2N−1)}, i.e.

$$W(k) = \frac{1}{\sqrt{2}} \alpha(k) \sum_{n=0}^{2N-1} v(n)\cos\left(\frac{\pi(2n+1)k}{4N}\right)$$

Figure 1:
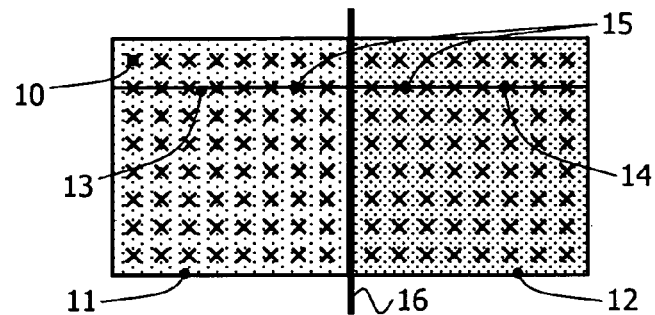

FIG. 1 shows the two adjacent segments u (13) and v (14) belonging respectively to two blocks (11, 12) of 8×8 pixels and situated at opposite sides of a block boundary (16). When it is assumed that the frequency contents of the segments u and v are close and the contents of the segments are uniform, the segment w (15) corresponding to the concatenation of the first and the second segment will include high spatial frequencies beyond those of the segments u and v if a block artifact is present between the segments u and v. Now, W can be expressed as a function of U and V in the following manner:

$$W(k) = \begin{cases} \frac{1}{\sqrt{2}}\left[U\left(\frac{k}{2}\right) + (-1)^{\frac{k}{2}}V\left(\frac{k}{2}\right)\right] & k \text{ pair} \\ \frac{1}{\sqrt{2}}\alpha(k)\sum_{n=0}^{N-1}\left[u(n)\cos\left(\frac{\pi(2n+1)k}{4N}\right) + (-1)^{\frac{k-1}{2}}v(n)\sin\left(\frac{\pi(2n+1)k}{4N}\right)\right] & k \text{ odd} \end{cases}$$

The predicted maximum frequency kwpred of W, i.e. if no block artifact were present, theoretically depends on the maximum frequencies kumax and kvmax of U and V in the following manner:

kwpred=2.max(kumax, kvmax)+2 where kumax=max(k∈{0, . . . ,N−1}/U(k)≠0)

kvmax=max(k∈{0, . . . ,N−1}/V(k)≠0)

and max is the function which yields the maximum of k values among a set of given values.

The coefficients W(k) corresponding to the frequencies k odd higher than the predicted maximum frequency kwpred are considered to be equivalent to block artifacts and are therefore set to zero.

It is an object of the invention to provide a data processing method by means of which a better display quality can be obtained for the digital image displayed on the screen. The invention takes the following aspects into consideration.

An image which belongs to a digital video signal is split into blocks of 8 rows of 8 pixels in order to be encoded in accordance with the MPEG standard, the first block of the image starting at the position (0,0). As a result of the digital to analog and the analog to digital conversion and as a result of any possible preprocessing algorithms applied to the digital video signal, an original image belonging to this signal may be shifted by a few pixels and the size of a grid corresponding to the MPEG blocks may have changed. The input image appearing at the input of a television set now does not contain any information by means of which it is neither possible to determine the change of the decoded image with respect to the origin nor the change in size of the grid corresponding to the blocks after decoding. Thus, the prior-art data processing method appears to be inefficient if it is used as such because it presumes that the origin of the decoded image is (0,0) and that the blocks have a size of 8×8 pixels.

According to the invention, in order to eliminate these drawbacks, the method of processing data comprised in a digital input image is characterized in that it further comprises a step of determining a real maximum frequency on the basis of transformed data resulting from the overall transform, and a step of detecting a grid on the basis of a comparison between the real maximum frequency and the predicted maximum frequency for a portion of said digital input image.

This grid detection step makes it possible to determine whether or not the digital input image has been encoded in accordance with a block-based encoding technique, the size of the grid corresponding to the encoding blocks of initially 8 rows of 8 pixels in the case of the MPEG standard, yielding blocks of 8 rows of 10, 12 or 16 pixels in the case of said standard, after a possible resampling of the image during decoding.

Figure 2:
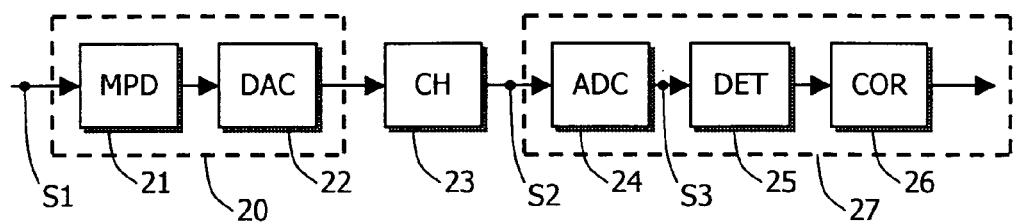
Figure 3:
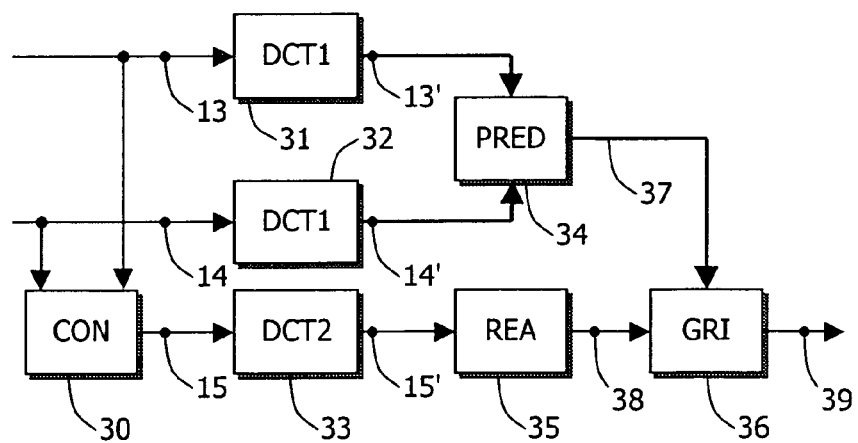
Figure 4:
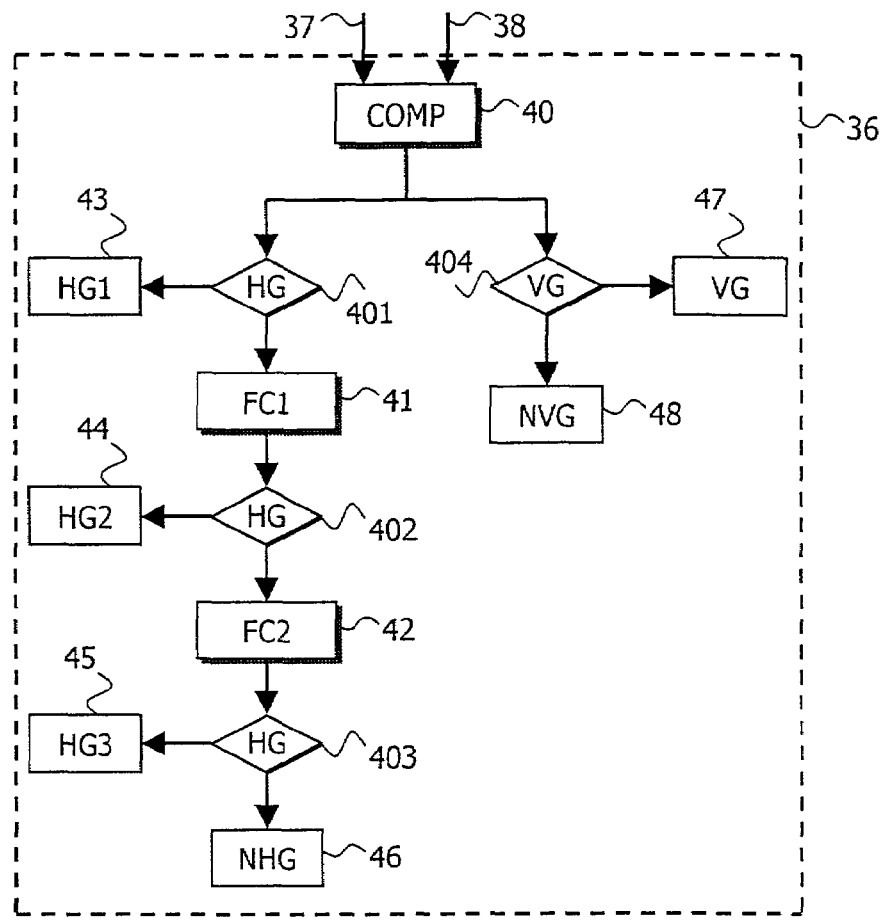
Figure 5:
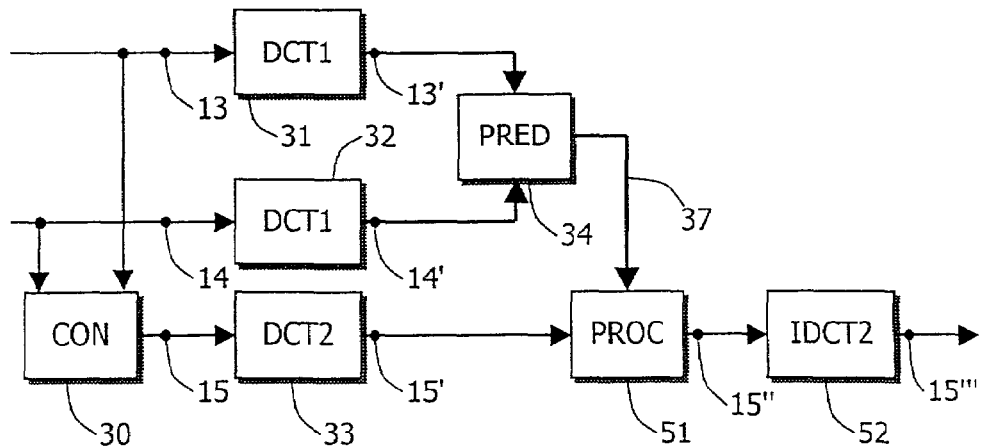

These aspects of the invention as well as more detailed other aspects will become apparent more clearly from the following description of a number of embodiments of the invention, which are given by way of example, with reference to the accompanying drawings, in which:

FIG. 1 illustrates the prior-art data processing method,

FIG. 2 is a diagram representing a data processing method in accordance with the invention for processing a digital video signal, FIG. 3 is a diagram representing a data processing method in accordance with the invention for detecting sequences of images encoded in accordance with a block-based encoding technique, FIG. 4 is a flow chart of the step of detecting images encoded in accordance with a block-based encoding technique, and FIG. 5 is a diagram representing a data processing method in accordance with the invention for correcting the encoded digital images.

The present invention relates to a method of processing data comprised in a digital input image, which method serves to improve the display quality of said digital input image when it has been encoded previously in accordance with a block-based encoding technique.

FIG. 2 illustrates a complete system for processing a digital video signal comprising encoded digital images (S1). If this system includes a decoder unit (20), which serves to transmit a decoded analog image (S2) to a television receiver (27) via a channel CH (23). The decoder unit comprises a decoder MPD (21) by means of which the digital video signal, which has been encoded in accordance with the block-based encoding technique, can be decoded, and a digital to analog converter DAC (22). The television receiver includes an analog to digital converter ADC (24), which serves to supply a digital input image (S3) to a device DET (25) which makes it possible to detect if said digital input image has been decoded in accordance with a block encoding technique. A correction or post-processing device COR (26), as opposed to a signal pre-processing performed before the encoding of said signal, now enables the display quality of the digital image to be improved for its display on the screen. The post-processing is performed in dependence on data supplied by the detection device.

The video signal available at the input of a television set comprises images formed by pixels but does not contain any information about possible encoding and decoding parameters of this signal if it has previously been encoded in accordance with a block-based encoding technique. This is why the detection device is adapted to determine the size and the position of a grid corresponding to the blocks which are used by the encoding technique and which may have been resampled during decoding. A proper application of the correction device indeed depends on the detection and the location of the grid.

The data processing method was developed particularly in the scope of digital images encoded and subsequently decoded in accordance with the MPEG standard. However, it remains applicable to any other digital video signal encoded and subsequently decoded in accordance with a block-based encoding technique such as, for example, H.261 or H.263.

An image belonging to a digital video signal encoded in accordance with the MPEG standard is divided into blocks of 8 rows of 8 pixels, the first block of the image starting at the position (0,0). As a result of digital to analog and analog to digital conversions and as a result of the possible use of algorithms for pre-processing the digital video signal an original image belonging to said signal may have been shifted by a few pixels. On the other hand, the original image may have been encoded in accordance with different horizontal encoding formats in order to maintain a satisfactory display quality at low transmission rates. In that case, the original image is down-sampled horizontally before it is encoded and is subsequently up-sampled horizontally during decoding in order to recover its initial format. This results in a change of the size of the grid owing to the up-sampling, encoding being still performed on blocks of 8 rows of 8 pixels.

In order to eliminate this drawback the data processing method in accordance with aims at detecting digital video signals encoded in accordance with the block-based encoding technique. For this purpose, said method, which is illustrated in FIG. 3, comprises the following steps:

A step of calculating a first discrete transform DCT1 (31), for example a cosine transform, for a first data set u (13). In the preferred variant this data set is formed by the luminance values of N pixels, where N=8 in the present example. The data processing method is applied in one dimension, i.e. along a row of N pixels in order to detect the width of the grid and along a column of N pixels in order to detect the height of said grid.

A step of calculating a second discrete transform DCT1 (32) for a second data set v (14) adjacent to the first set. In the preferred variant this second data set is also formed by N pixels.

A step of calculating an overall discrete transform DCT2 (33) for a data set w (15) corresponding to the concatenation CON (30) of the first and the second set and consequently formed by 2N pixels in the present case.

A step of determining PRED (34) a predicted maximum frequency kwpred (37) on the basis of the transformed data U (13') and V (14') resulting from the first (31) and the second (32) transform DCT1, which is calculated in the following manner: kwpred=2.max(kumax, kvmax)+2 where $$\text{kumax} = \max(k \in \{0, \ldots, N-1\} / abs(U(k)) > T),$$

$$\text{kvmax} \leq \max(k \in \{0, \ldots, N-1\} / abs(V(k)) > T),$$

abs(x) is the function giving the absolute value of x, and where T is a threshold value greater than or equal to zero A step of determining REA (35) a real maximum frequency kwmax (38) on the basis of the transformed data W (15') resulting from the overall transform, which is calculated in the following manner:

$$\text{kwmax} = \max(k \in \{0, \ldots, 2N-1\} / abs(W(k)) > T)$$

A detection step GRI (36) which makes it possible to determine if the digital input image has been encoded in accordance with a block-based encoding technique, which is effected by means of a comparison between the real maximum frequency kwmax (38) and the predicted maximum frequency kwpred (37) for a portion of the digital input image. In the preferred variant said portion is formed by one row of every twenty rows of an image in order to detect the width of the grid and by one column of every twenty columns of this image in order to detect the height of the grid. Such a method requires minimal calculating resources while it ensures a satisfactory detection quality. Subsequently, the values kwpred(j) and kwmax(j) are calculated for each pixel j of the row or the column through iteration of the calculation of the transforms DCT1 and DCT2 after each incrementation by one pixel. The detection step thus indicates if a grid has been detected and, if this is so, it gives the size and the location of this grid (39).

FIG. 4 is a flow chart which illustrates the detection step (36) in greater detail. This detection step comprises a sub-step COMP (40) of computing a quantity X(j) such that:

$$X(j)=\text{kwpred}(j)-\text{kwmax}(j)$$

On a block boundary the value of X(j) is greater than a threshold XT. In the preferred variant the value of the threshold XT is 4. In order to detect the position and the size of the grid the values j of X which meet this requirement are stored and a histogram of these modulo 8 values is generated. The grid is detected if one value of the histogram is high and distinctly preponderates over the 7 other values, i.e. in the preferred variant if:

the first maximum of the histogram is greater than 1 and equal to 3 times the second maximum of this histogram, and the first maximum of the histogram is greater than 10.

A first test HG (401) is then performed in the horizontal direction in order to determine if a grid having a width of 8 pixels has been detected. If this is the case, the detection step is terminated, which yields the result HG1 (43), which indicates that a grid having a width of 8 or of 16 pixels has been detected, the last-mentioned width corresponding to an image format of ½. In the opposite case, a first sub-step FC1 (41) of converting the format is performed in order change from an original image having a width of 720 pixels to an image having a width of 540 pixels, i.e. an image format of ¾. For this purpose, a row of an image is up-sampled by a factor of 3 by adding two zeros between two pixels of the original image and by filtering with the aid of a filter F1. The filter F1 has, for example, 19 coefficients and is as follows:

$$F1=[9,6,0,-21,-9,0,103,220,295,330,295,220,103,0,-9,-21,0,6,9]$$

The signal thus obtained is subsequently down-sampled by selecting one out of four pixels.

The frame detection method is then applied again to the converted digital video signal. Then a second test HG (402) is performed in the horizontal direction in order to determine if a grid having a width of 8 pixels has been detected in the image after format conversion. If this is the case, the detection step is terminated, which yields the result HG2 (44), which indicates that a grid having a width of 10 pixels has been detected in the initial image before the format conversion. In the opposite case, a second sub-step FC2 (42) of converting the format is performed in order to change from an original image having a width of 720 pixels to an image having a width of 480 pixels, i.e. an image format of ⅔. For this purpose, the row of an image is up-sampled by a factor of 2 by adding a zero between two pixels of the original image and by filtering with the aid of a filter F2. The filter F2 has, for example, 15 coefficients and is as follows:

$$F2=[-3,-37,-41,-20,52,163,248,300,248,163,52,-20,-41,-37,-3]$$

The signal thus obtained is subsequently down-sampled by selecting one out of three pixels.

The frame detection method is then again applied to the digital video signal thus converted. A third test HG (403) is then performed in the horizontal direction in order to determine if a grid having a width of 8 pixels has been detected in the image after image conversion. If this is the case, the detection step is terminated, which yields the result HG3 (45) which indicates that a grid having a width of 12 pixels has been detected in the original image. In the opposite case, the result NHG (46) corresponds to the fact that no grid has been detected in the horizontal detection.

At the same time, the frame detection method is applied to the digital input image in the vertical direction. A test VG (404) is performed in order to determine if a grid having a height of 8 pixels has been detected. If this is the case, the detection step is terminated, which yields the result VG (47) which indicates that a grid having a height of 8 pixels has been detected. In the opposite case, the result NVG (48) corresponds to the fact that no grid has been detected in the vertical direction.

The grid detection method has been described for the image formats used in the MPEG standard. However, the method is not limited to these formats and can be used with other image formats without departing from the scope of the invention.

The detection method just described makes it possible to detect if a video signal received by a television set has been encoded in accordance with a block encoding method. Said method also indicates the size and the location of the grid which corresponds to the blocks on the basis of which encoding has been effected. A post-processing method is then applied as a function of the data provided by the detection method, preferably to the image after format conversion, which is in order to process blocks of 8 rows of 8 pixels. The image is subsequently reconverted to full-screen format (i.e. 720 pixels) after processing for the purpose of being displayed on the screen.

In an advantageous variant the post-processing method employs steps common to the detection method in accordance with the invention. FIG. 5 illustrates such a method of post-processing of digital video data. Said method comprises:

a step of calculating a first discrete transform DCT1 (31) for a first set of N data u (13), a step of calculating a second discrete transform DCT1 (32) for a second set of N data v (14) adjacent to the first set, a step of calculating an overall discrete transform DCT2 (33) for a set of 2N data w (15) corresponding to the concatenation (30) of the first and the second set and yielding a set of transformed data W (15'), A step of determining PRED (34) a predicted maximum frequency kwpred (37) on the basis of the transformed data U (13') and V (14') resulting from the first (31) and the second (32) transform DCT1, which frequency is calculated in the following manner:

$$\text{kwpred}=2.\max(\text{kumax},\text{kvmax})+2$$

where $$kumax = max(k \in \{0, \ldots, N-1\}/abs(U(k)) > T),$$

$$kvmax = max(k \in \{0, \ldots, N-1\}/abs(V(k)) > T),$$

where T is a non-zero threshold value.

The determining step in accordance with the invention provides a refinement of the calculation of the critical maximum frequency on the basis of the introduction of the threshold value T. This refinement enables a more effective correction of the image to be achieved. The threshold value T is a function of the number of pixels belonging to the sets of data u and v.

The post-processing method also includes a correction step PROC (51) which itself has a sub-step for the detection of natural contours on the basis of the initial data values u and v and the transformed data values U and V. This sub-step enables said natural contours to be distinguished from block boundaries caused by encoding artifacts. A natural contour is then detected if two conditions are fulfilled:

the average values $\bar{u}$ et $\bar{v}$ of the sets of data u and v at opposite sides of a block boundary differ by a substantial value greater than M, i.e.: $|\bar{u}-\bar{v}|>M$, and the sets of data u and v exhibit a low activity, which manifests itself in that the values of kumax and kvmax are low and smaller than k0, i.e. kumax<k0 and kvmax<k0.

The correction step PROC also includes a sub-step of truncation that zeroes the transformed data W (15') resulting from the overall discrete transform whose frequency is odd and higher than the predicted maximum frequency, yielding truncated data (15").

The post-processing method finally includes a step of calculating the inverse discrete transform IDCT2 (52) of the truncated data, yielding decoded data (15'''), which are subsequently intended to be displayed on the screen.

Unlike the detection method described hereinbefore, which can be applied to a portion of the image, for example some rows and some columns, the post-processing method is preferably applied to the whole image.

Moreover, this post-processing method may be applied either after the detection method or at the output of a decoder (21), the parameters supplied by the decoder making it possible to know the position of the frame corresponding to the encoding blocks.

The post-processing method also includes two successive phases whose order of application does not matter:

the correction of vertical artifacts, which corresponds to a row-by-row processing of the data, the correction of horizontal artifacts, which corresponds to a column-by-column processing of the data.

Finally, in the case of interlaced image sequences, the image is de-interlaced so as to form two fields. Each of the two fields is subsequently subjected to the post-processing method. After processing the two fields are then re-interlaced.

In a first variant of the post-processing method in accordance with the invention the sets of data u (13) and v (14) contain luminance values associated with N=8 successive pixels. The step of determining PRED (34) the predicted maximum frequency kwpred (37) on the basis of the transformed data U (13') and V (14') resulting from the first (31) and the second (32) transforms DCT1 is then performed with a horizontal threshold Th=5 for the correction of vertical artifacts and with a vertical threshold Tv=5 in the progressive (i.e. non-interlaced) mode and Tv=3 in the interlaced mode for the correction of horizontal artifacts. As a matter of fact, the correction of horizontal artifacts in the last-mentioned case is realized by processing the sets of data u and v corresponding to a resolution equal to half the horizontal resolution, which explains the value of the vertical threshold with respect to that of the horizontal threshold. As regards the sub-step for the detection of natural contours, the values of M and k0 are preferably set to 30 and 3.

In a second variant of the post-processing method in accordance with the invention the data sets u (13) and v (14) contain luminance values associated with N=4 consecutive pixels. Consequently, the threshold values are then changed to, for example, Th=10, Tv=5 in the interlaced mode, M=25 and k0=1. By means of such a simplification the complexity of the processing algorithm can be reduced but this may considerably reduce the correction efficiency.

Finally, in a third variant of the post-processing method in accordance with the invention the data sets u (13) and v (14) each contain luminance values associated with N=8 consecutive pixels. However, the data sets u (13) and v (14) are divided into two sub-sets u', u'' and v', v'', respectively, the sub-sets u', v' containing the data of odd rank and the sub-sets u'' and v'' containing the data of even rank.

The steps of calculating the discrete transforms (31, 32, 33) are applied to the sub-sets u', v', on the one hand, and u'', v', on the other hand, yielding the transformed data U', V', W' and U'', V'', W'', respectively.

At the same time, the step of determining PRED (34) provides the predicted maximum frequencies kw'pred and kw''pred (37), which are calculated as follows:

$$kw'pred = 2 \cdot max(ku'max, kv'max) + 2$$

where $$ku'max = max(k \in \{0, \ldots, N-1\}/abs(U'(k)) > Th \text{ or } Tv)$$

$$kv'max = max(k \in \{0, \ldots, N-1\}/abs(V'(k)) > Th \text{ or } Tv)$$

$$kw''pred = 2 \cdot max(ku''max, kv''max) + 2$$

where $$ku''max = max(k \in \{0, \ldots, N-1\}/abs(U''(k)) > Th \text{ or } Tv)$$

$$kv''max = max(k \in \{0, \ldots, N-1\}/abs(V''(k)) > Th \text{ or } Tv)$$

in which, for example, Th=10 and Tv=5 in the interlaced mode.

The correction step PROC (51) independently of the transformed data W' and W'', with:

a sub-step for the detection of natural contours, such as, for example:

$$|\bar{u}'-\bar{v}'|>25, ku'max<1 \text{ and } kv'max<1$$

where $$|\bar{u}''-\bar{v}''|>25, ku''max<1 \text{ and } kv''max<1$$

a sub-step of truncation of the transformed data W' or W'' resulting from the overall discrete transform whose frequency is higher than the predicted maximum frequency kw'pred or kw''pred.

This variant enables the processing complexity to be reduced while at the time the correction efficiency of the first variant is maintained. The sub-step for the detection of natural contours is not essential for a good working of the post-processing method in accordance with the third variant.

The above description with reference to FIGS. 1 to 5 illustrates rather than limits the invention. It is evident that there are numerous alternatives within the scope of the appended Claims.

There are numerous ways of implementing the described functions by means of software. In this respect, it is to be noted that FIGS. 2 to 5 are highly diagrammatic, each Figure representing merely a single variant. Thus, although a Figure shows different functions as separate blocks, this does not exclude the possibility that a single item of software performs a plurality of functions. This by no means excludes the possibility that a function may be carried out by a group of software items.

These functions may be realized by means of a television receiver circuit or by means of a suitably programmed set top box circuit in the case of the post-processing method. A set of instructions contained in a program memory can cause the circuit to carry out the different operations described hereinbefore with reference to FIGS. 2 to 5. The set of instructions can also be loaded into the program memory by reading a data carrier, such as for example a disc which carries the set of instructions. Reading may also be effected via a communication network such as, for example, the internet. In this case, a service provider will make the set of instructions available to those interested.

Any reference signs given in parentheses in a claim shall not be construed as limiting said claim. The use of the verb "to comprise" does not exclude the presence of any elements or steps other than those defined in a claim. The use of the indefinite article "a" or "an" preceding an element or step does not exclude the presence of a plurality of these elements or these steps.

The invention claimed is:

1. A method of processing data comprised in a digital input image by a processor, said method comprising the acts of:
    calculating a first discrete transform of a first data set by the processor;
    calculating a second discrete transform of a second data set adjacent to the first set by the processor;
    calculating an overall discrete transform of a data set corresponding to the concatenation of the first and the second set by the processor;
    determining a predicted maximum frequency based on the transformed data resulting from the first transform and the second transform by the processor and based on a threshold value, wherein the threshold value is a function of a number of pixels belonging to the first data set and the second data set;
    determining a real maximum frequency based on the transformed data resulting from the overall transform by the processor; and
    detecting a grid by a comparison between the real maximum frequency and the predicted maximum frequency for a portion of the digital input image.

2. A data processing method as claimed in claim 1, further comprising the act of correcting the digital input image if a grid has been detected, the correction act being applied taking into account a size and a position of said grid.

3. A non-transitory computer readable medium for use with a set top box, said non-transitory computer readable medium embodying a computer program, comprising instructions when executed by a processor is configured to performing the acts of:
    calculating a first discrete transform of a first data set;
    calculating a second discrete transform of a second data set adjacent to the first set;
    calculating an overall discrete transform of a data set corresponding to the concatenation of the first and the second set;
    determining a predicted maximum frequency based on the transformed data resulting from the first transform and the second transform and based on a threshold value, wherein the threshold value is a function of a number of pixels belonging to the first data set and the second data set;
    determining a real maximum frequency on the basis of the transformed data resulting from the overall transform; and
    detecting a grid by means of a comparison between the real maximum frequency and the predicted maximum frequency for a portion of the digital input image.

* * * * *